(12) United States Patent
Amerga et al.

(10) Patent No.: US 9,532,185 B2
(45) Date of Patent: Dec. 27, 2016

(54) ACHIEVING FAST EMBMS CHANNEL SWITCHING AND ADDING IN LTE

(71) Applicant: QUALCOMM Incorporated, San Diego, CA (US)

(72) Inventors: Daniel Amerga, San Diego, CA (US); Sivaramakrishna Veerepalli, San Diego, CA (US); Shailesh Maheshwari, San Diego, CA (US); Kuo-Chun Lee, San Diego, CA (US); Jack S. Shauh, San Diego, CA (US); Ankur Verma, San Diego, CA (US); Zhen Zhang, Beijing (CN); Muralidharan Murugan, San Diego, CA (US); Ralph Akram Gholmieh, San Diego, CA (US); Pratik Kotkar, San Diego, CA (US); Hashim Shaik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 13/752,352

(22) Filed: Jan. 28, 2013

(65) Prior Publication Data
US 2013/0294316 A1    Nov. 7, 2013

Related U.S. Application Data

(60) Provisional application No. 61/641,866, filed on May 2, 2012.

(51) Int. Cl.
*H04W 4/06* (2009.01)
*H04W 72/00* (2009.01)

(52) U.S. Cl.
CPC ............. *H04W 4/06* (2013.01); *H04W 72/005* (2013.01)

(58) Field of Classification Search
None
See application file for complete search history.

(56) References Cited

U.S. PATENT DOCUMENTS

2005/0041681 A1* 2/2005 Lee .................. H04W 72/1289
370/437
2005/0213583 A1 9/2005 Lee et al.
(Continued)

FOREIGN PATENT DOCUMENTS

| JP | 2008544662 A | 12/2008 |
|---|---|---|
| JP | 2009182944 A | 8/2009 |
| WO | 2012015884 A1 | 2/2012 |

OTHER PUBLICATIONS

International Search Report and Written Opinion—PCT/US2013/036191—ISA/EPO—Jul. 25, 2013.
(Continued)

*Primary Examiner* — Chirag Shah
*Assistant Examiner* — Srinivasa Reddivalam
(74) *Attorney, Agent, or Firm* — Arent Fox LLP

(57) ABSTRACT

A method, an apparatus, and a computer program product for wireless communication are provided. The apparatus receives a first MTCH. The apparatus stores MBMS control information for at least a second MTCH. The apparatus subsequently determines to receive the second MTCH. The apparatus then accesses the stored MBMS control information for the second MTCH upon determining to receive the second MTCH. The apparatus receives the second MTCH based on the accessed MBMS control information without acquiring the MBMS control information for the second MTCH after the determination to receive the second MTCH.

34 Claims, 16 Drawing Sheets

(56) References Cited

U.S. PATENT DOCUMENTS

| | | | |
|---|---|---|---|
| 2009/0149164 A1* | 6/2009 | Cai | H04W 72/005 455/414.2 |
| 2010/0284319 A1 | 11/2010 | Wang et al. | |
| 2011/0149827 A1 | 6/2011 | Na et al. | |
| 2011/0194477 A1* | 8/2011 | Damnjanovic | H04W 72/005 370/312 |
| 2011/0243054 A1* | 10/2011 | Yi | H04W 72/121 370/312 |
| 2012/0236776 A1 | 9/2012 | Zhang et al. | |
| 2012/0257562 A1 | 10/2012 | Kim et al. | |
| 2013/0035129 A1* | 2/2013 | Wei | H04W 4/06 455/517 |
| 2014/0301269 A1* | 10/2014 | Cai | H04L 12/18 370/312 |

OTHER PUBLICATIONS

Kottkamp A.M., et al., "LTE Release 9. Technology Introduction". Rohde&Schwarz. White Paper. [Online] Dec. 8, 2011 (Dec. 8, 2011). pp. 1-44. XP002700280. Munich. Germany Retrieved from the Internet: URL:http://cdn.rohdeschwarz.com/dl downloads/dl application/application notes/1ma191/1MA191OE.pdf> -[retrieved on Jul. 5, 2013].

Catt, "Unicast Decoding in MBSFN Subframe," R2-115116, 3GPP, Oct. 3, 2011.

Samsung, "Baseline CR Capturing MBMS Agreements Affecting 36.331," R2-094077, 3GPP, Jul. 3, 2009.

\* cited by examiner

ACHIEVING FAST EMBMS CHANNEL SWITCHING AND ADDING IN LTE

CROSS-REFERENCE TO RELATED APPLICATION(S)

This application claims the benefit of U.S. Provisional Application Ser. No. 61/641,866, entitled "ACHIEVING FAST CHANNEL SWITCHING AND ADDING IN LTE EMBMS" and filed on May 2, 2012, which is expressly incorporated by reference herein in its entirety.

BACKGROUND

Field

The present disclosure relates generally to communication systems, and more particularly, to achieving fast channel switching and adding in Long Term Evolution (LTE) evolved Multimedia Broadcast Multicast Service (eMBMS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a first multicast traffic channel. The apparatus stores multimedia broadcast multicast service control information for at least a second multicast traffic channel. The apparatus determines to receive the second multicast traffic channel. The apparatus accesses the stored multimedia broadcast multicast service control information for the second multicast traffic channel upon determining to receive the second multicast traffic channel. The apparatus receives the second multicast traffic channel based on the accessed multimedia broadcast multicast service control information without acquiring the multimedia broadcast multicast service control information for the second multicast traffic channel after the determination to receive the second multicast traffic channel.

DETAILED DESCRIPTION

Figure 1:
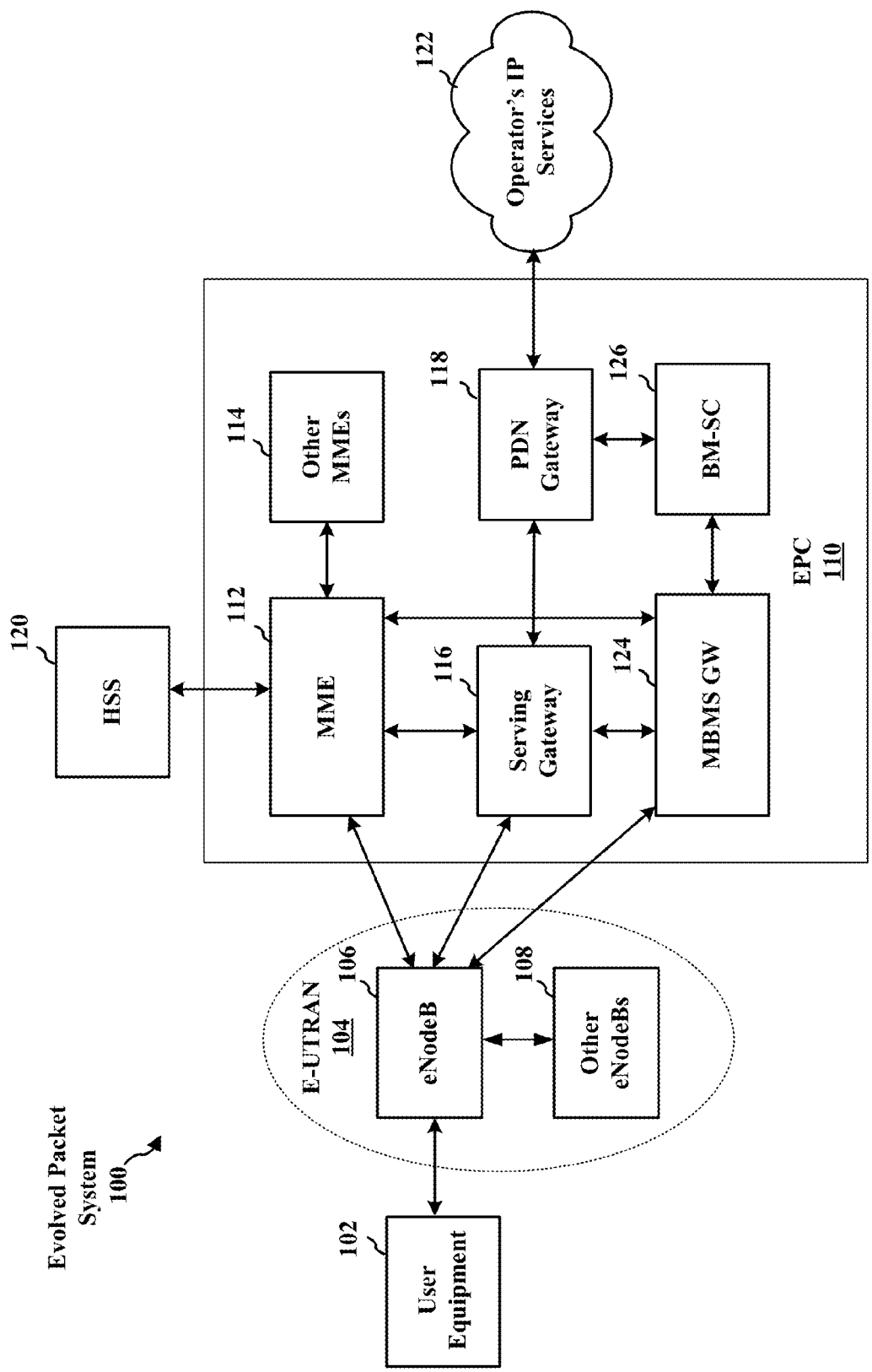
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
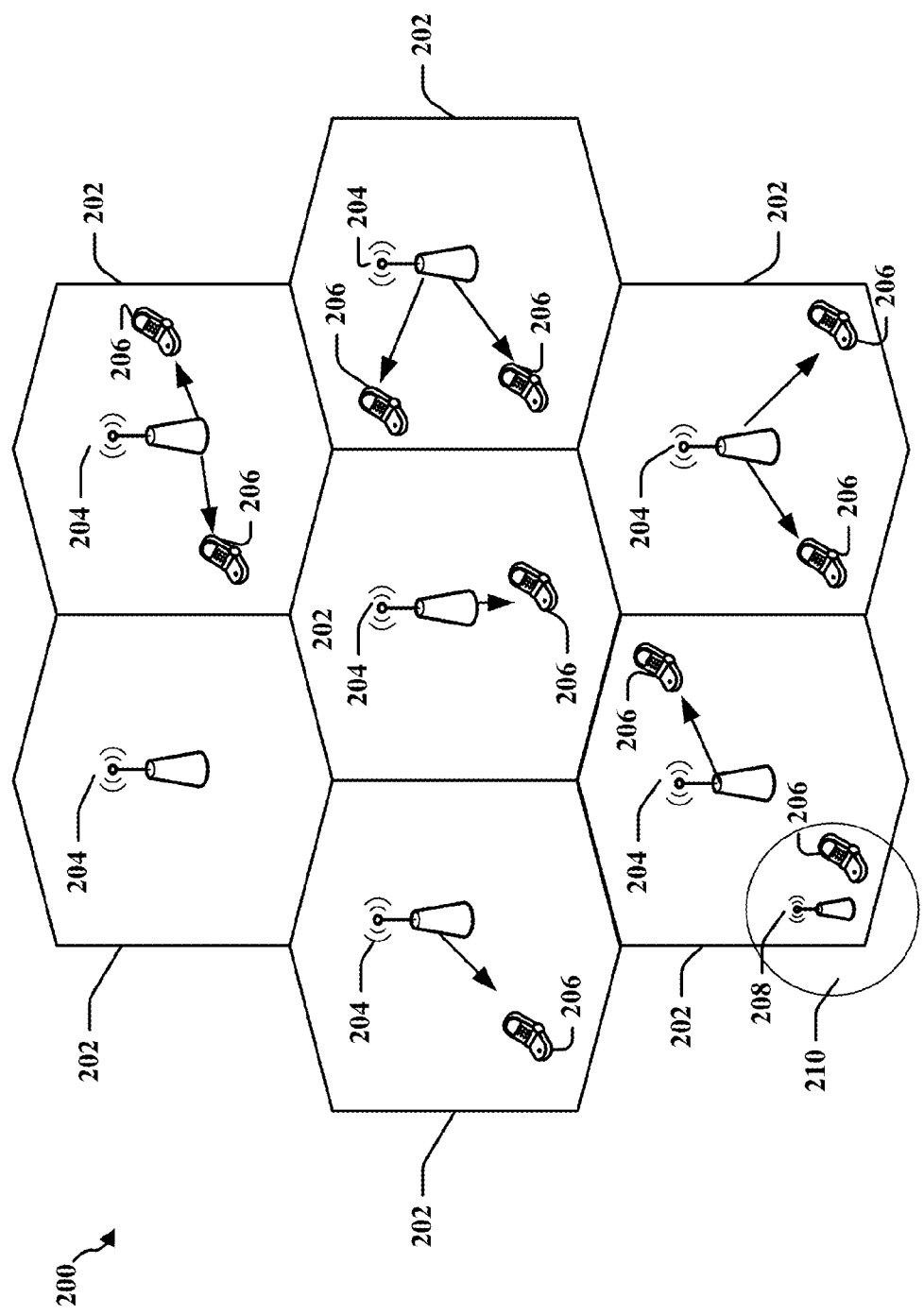
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to an Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
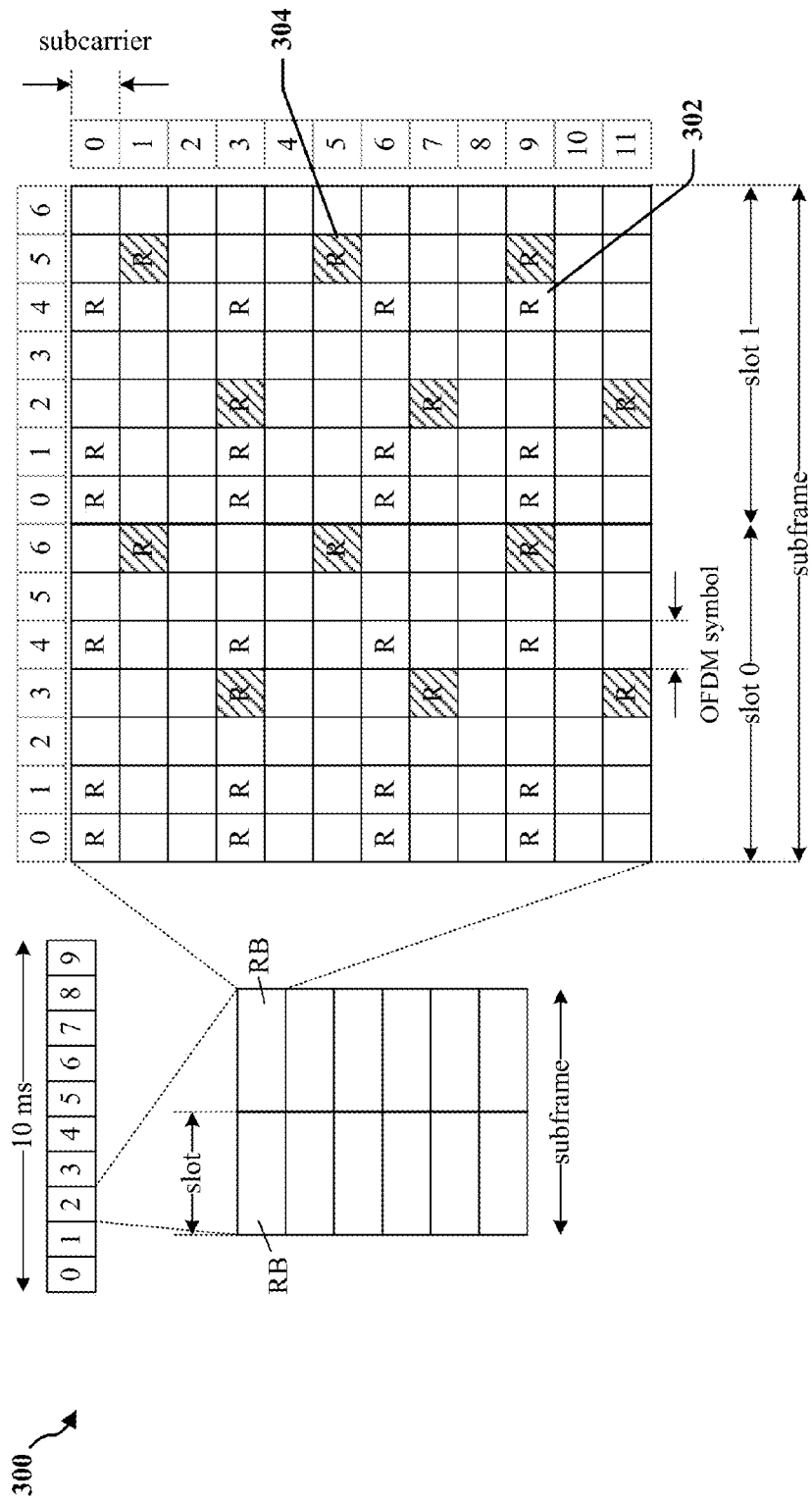
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
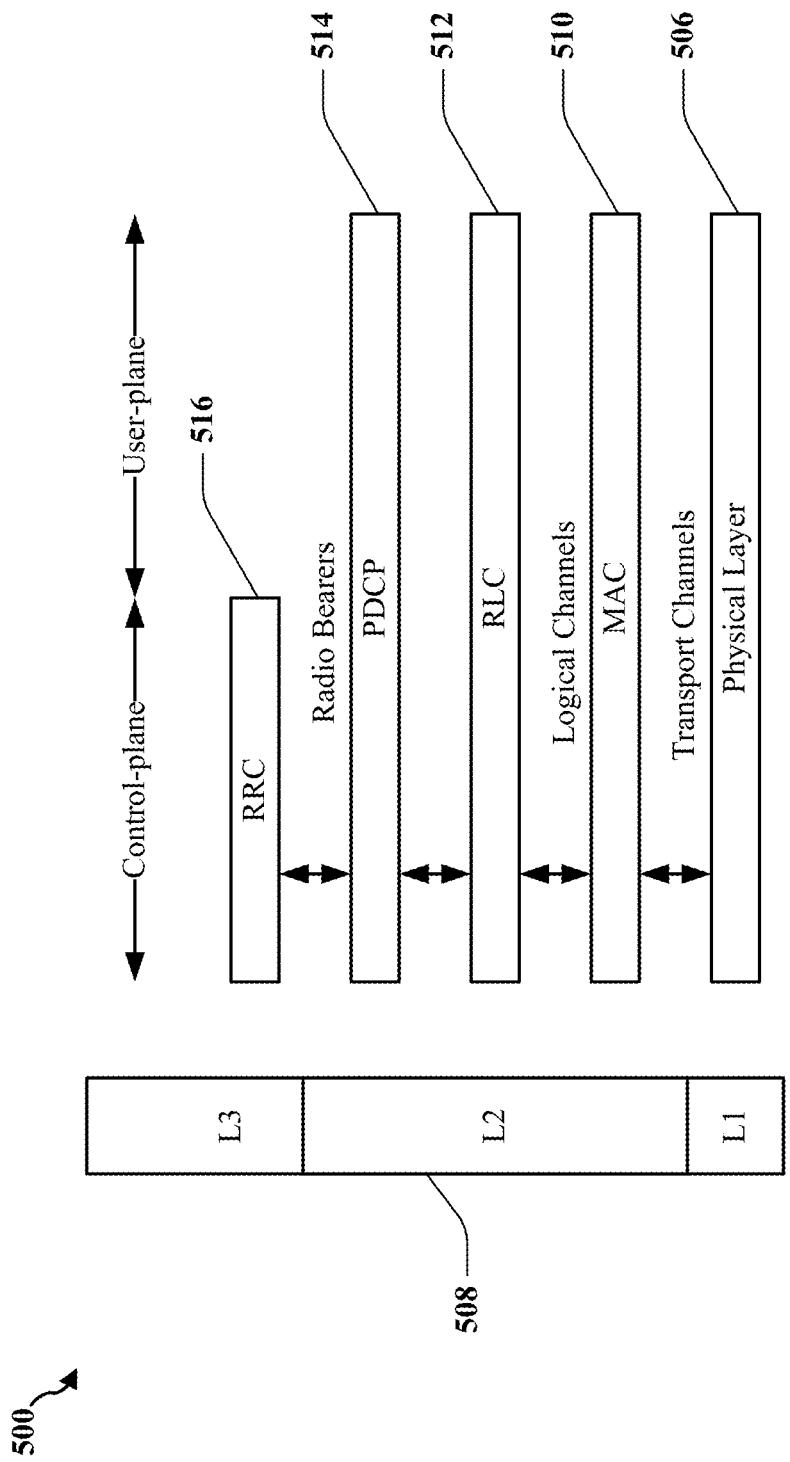
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
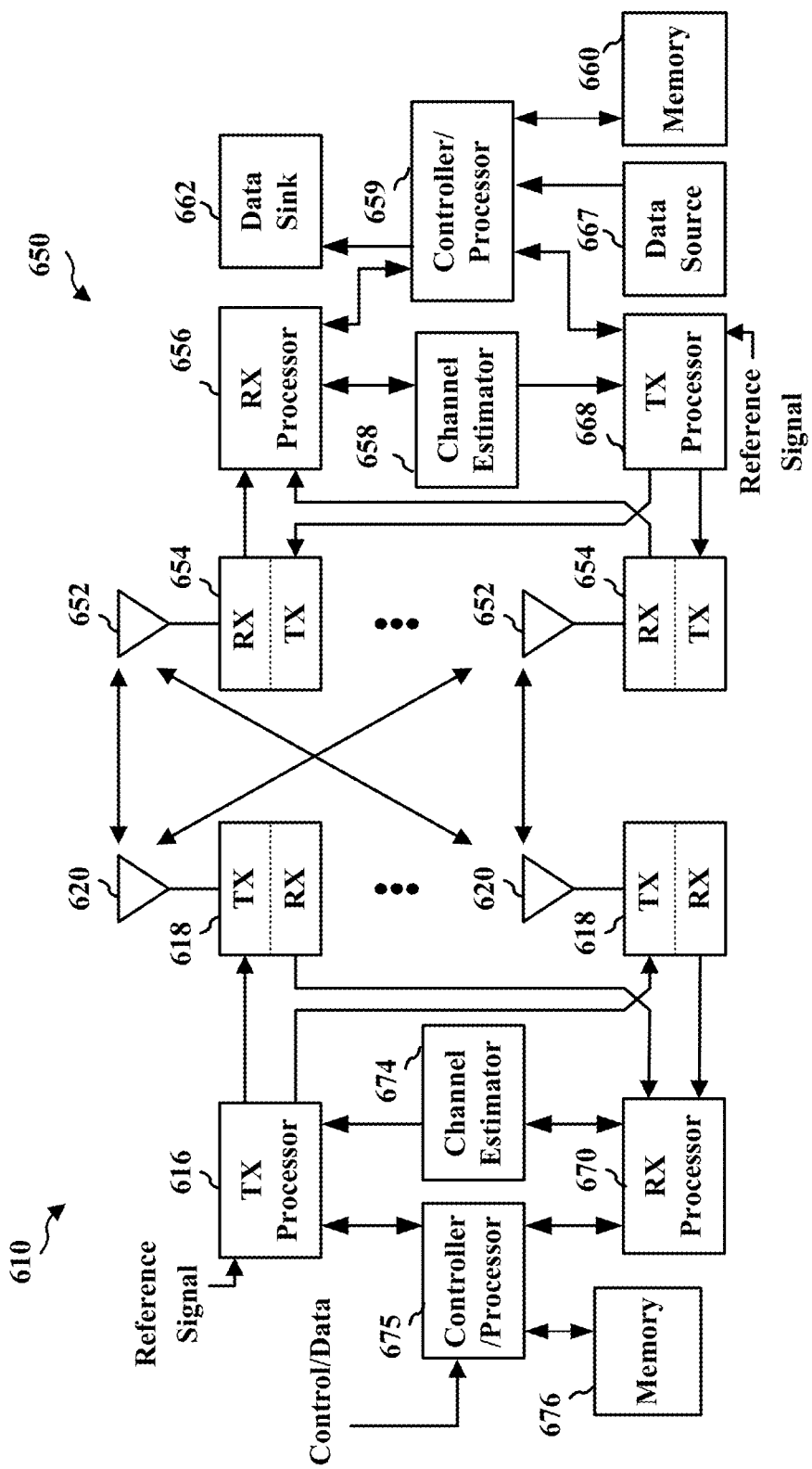
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
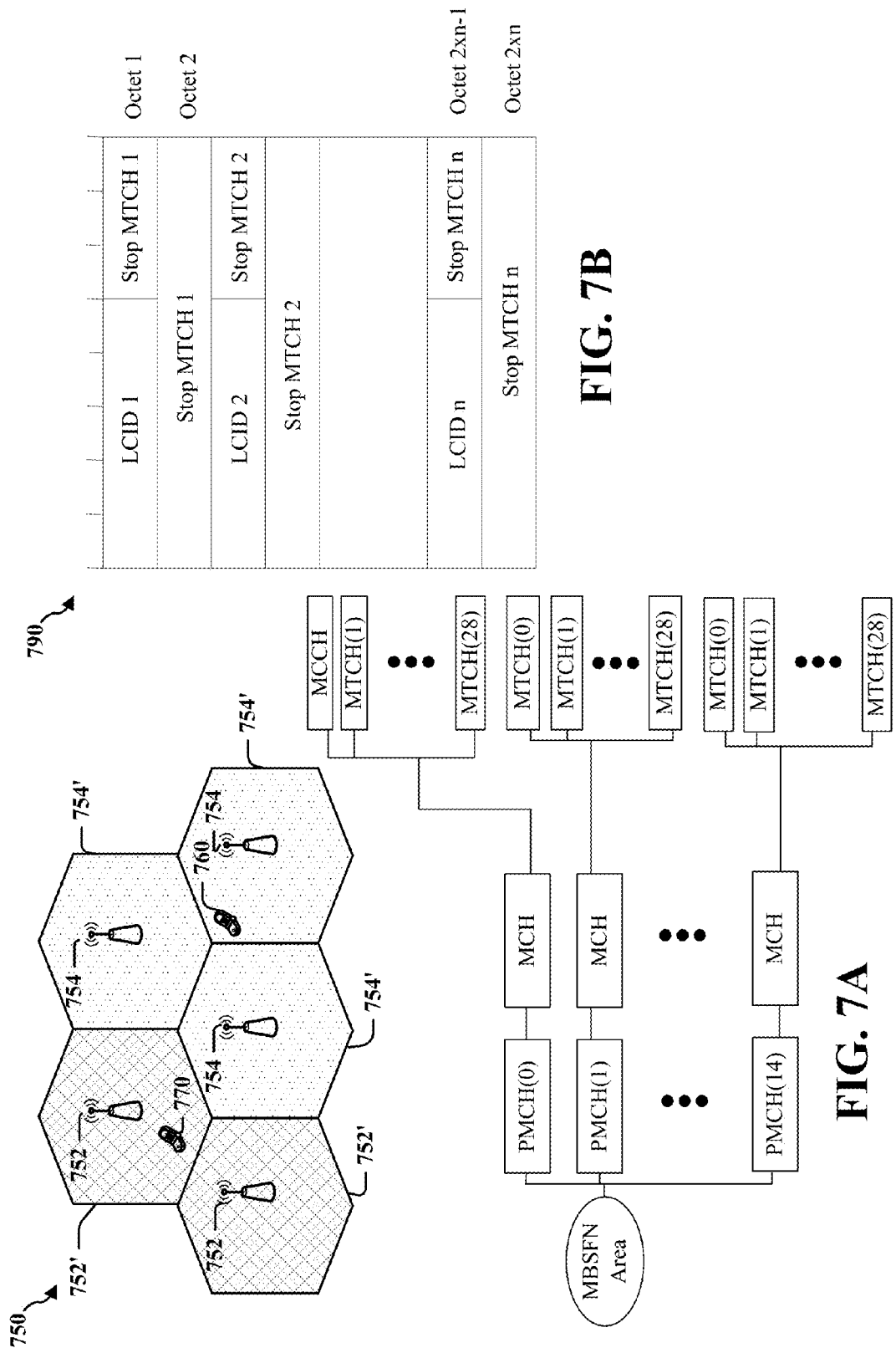
FIG. 7A is a diagram illustrating an example of an evolved Multicast Broadcast Multimedia Service channel configuration in a Multi-Media Broadcast over a Single Frequency Network.
FIG. 7B is a diagram illustrating a format of a Multicast Channel Scheduling Information Media Access Control control element.

FIG. 7A is a diagram 750 illustrating an example of an eMBMS channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE acquires a system information block (SIB) 13 (SIB13). In a second step, based on the SIB13, the UE acquires an MBSFN Area Configuration message on an MCCH. In a third step, based on the MBSFN Area Configuration message, the UE acquires an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There is one MSI per PMCH per MBSFN area.

Figure 8:
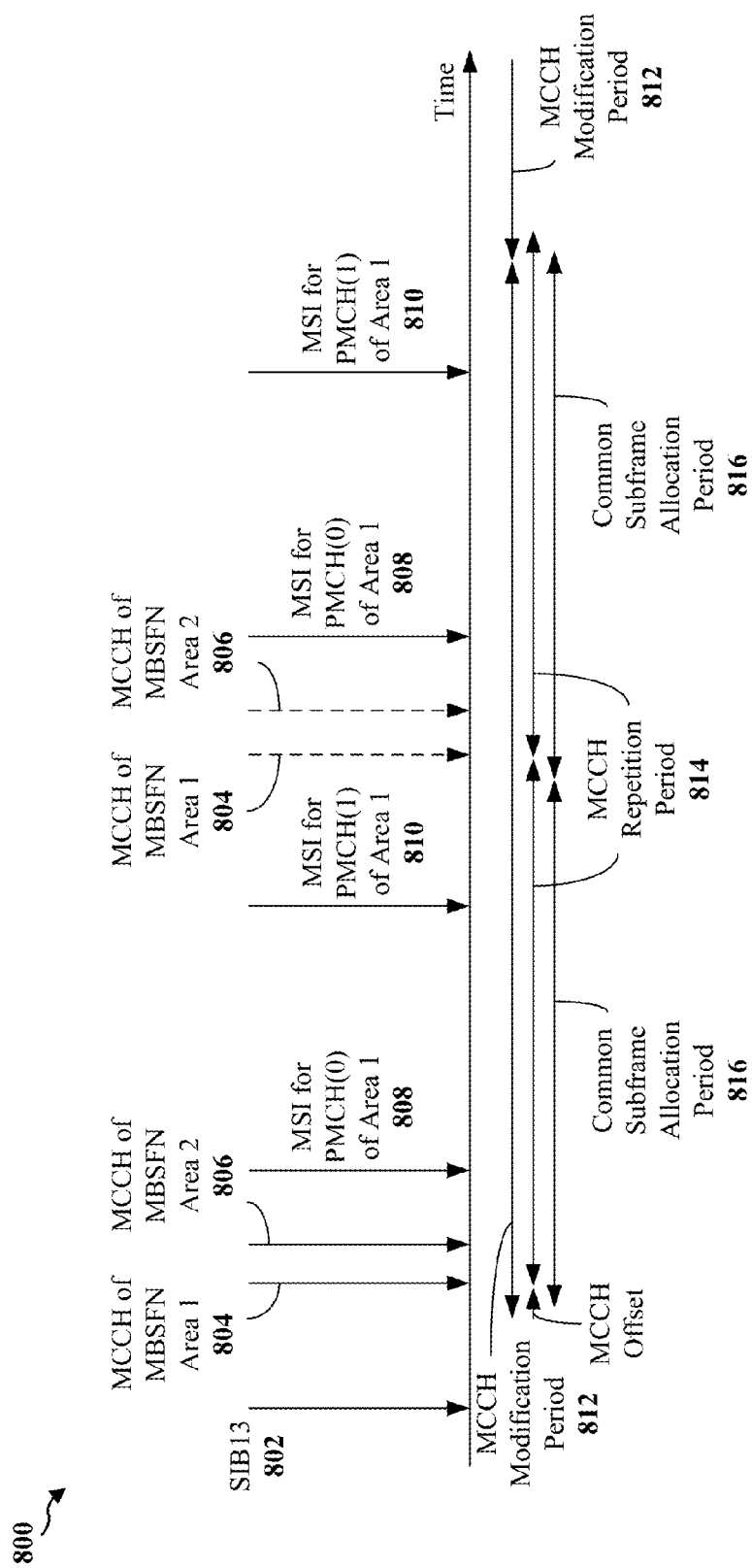
FIG. 8 is a diagram for illustrating an exemplary method.

FIG. 8 is a diagram 800 for illustrating an exemplary method. A UE may receive a SIB13 802 from a serving eNB. As discussed supra, the SIB13 includes an MBSFN area identifier of each MBSFN area supported by the eNB. The SIB13 802 further includes information for acquiring an MCCH (e.g., the MCCH 804 and the MCCH 806) for each of the supported MBSFN areas, such as information regarding an MCCH repetition period 814, an MCCH offset, and an MCCH modification period 812. The MCCH repetition period 814 is the time period in which the MCCH carrying an MBSFN area configuration message repeats. The MCCH offset is the offset of the start of the MCCH repetition period 814 from the MCCH modification period 812. The SIB13 802 further includes the signaling MCS, subframe allocation information, and MCCH change notification configuration information. The MCCH carries an MBSFN area configuration message. The MBSFN area configuration message includes a TMGI and an optional session ID of each MTCH associated with each PMCH of the MBSFN area, allocated resources for each PMCH of the MBSFN area, and an MSP within a common subframe allocation period 816 over which MSI (e.g., MSI 808 and/or MSI 810) can be acquired. From the MBSFN area configuration message, a UE can determine how to obtain the MSI for a TMGI of interest.

When a user selects/switches to a different traffic channel or adds a new traffic channel, the UE acquires the MCCH and the MSI for the new traffic channel in order to receive the new traffic channel. Depending on the MCCH repetition period and the MSP, the time delay can vary. For example, if the MCCH repetition period is 128 radio frames and the MSP is 128 radio frames, the UE can wait 2.56 seconds before the new traffic channel can be received. The long delay can substantially degrade the user experience.

In an exemplary method, a UE stores eMBMS control information (e.g., configuration information in the MBSFN area configuration messages and/or MSI) for at least one MTCH that the UE is not receiving, and accesses the stored eMBMS control information upon determining to received an MTCH of the at least one MTCH. Specifically, a UE may receive a first MTCH. The UE may store eMBMS control information for at least a second MTCH. At some point, the UE may determine to receive the second MTCH. Upon determining to receive the second MTCH, the UE accesses the stored MBMS control information for the second MTCH. The UE then receives the second MTCH based on the accessed MBMS control information without acquiring the MBMS control information for the second MTCH after the determination to receive the second MTCH.

In a first configuration, the UE acquires the SIB13 and determines the MBSFN areas supported by the serving eNB. The UE then acquires and stores the MBSFN area configuration messages of the MCCHs or the information within the messages for a plurality of the MBSFN areas. For example, if the serving eNB supports two or more MBSFN areas, the UE may acquire and store the MBSFN area configuration messages for the MCCH 804 and the MCCH 806. To reduce processing of the MBSFN area configuration messages, once the UE successfully acquires an MBSFN area configuration message, the UE may skip remaining repetitions of the MCCH for the MCCH modification period 812 and refrain from receiving subsequent instances of the MBSFN area configuration messages. For example, as shown in FIG. 8, if the UE successfully acquires the first instances of the MCCHs 804, 806 within an MCCH modification period 812, the UE may refrain from receiving the subsequent instances of the MCCHs 804, 806 in the same MCCH modification period 812. In the first configuration, when a UE determines to receive the second MTCH, the UE determines the MBSFN area that provides the second MTCH and accesses the stored MBSFN area configuration message for the determined MBSFN area. Thus, the UE saves time by accessing the stored MBSFN area configuration message associated with the second MTCH rather than waiting to acquire the MBSFN area configuration message associated with the second MTCH.

In a second configuration, the UE may additionally or alternatively store MSI. The UE may store the MSI for the PMCH associated with the first MTCH, the MSI for all PMCHs associated with the MBSFN area providing the first MTCH, or the MSI for all PMCHs associated with all of the MBSFN areas. An example of the first and second configurations are provided infra with respect to FIG. 9.

Figure 9:
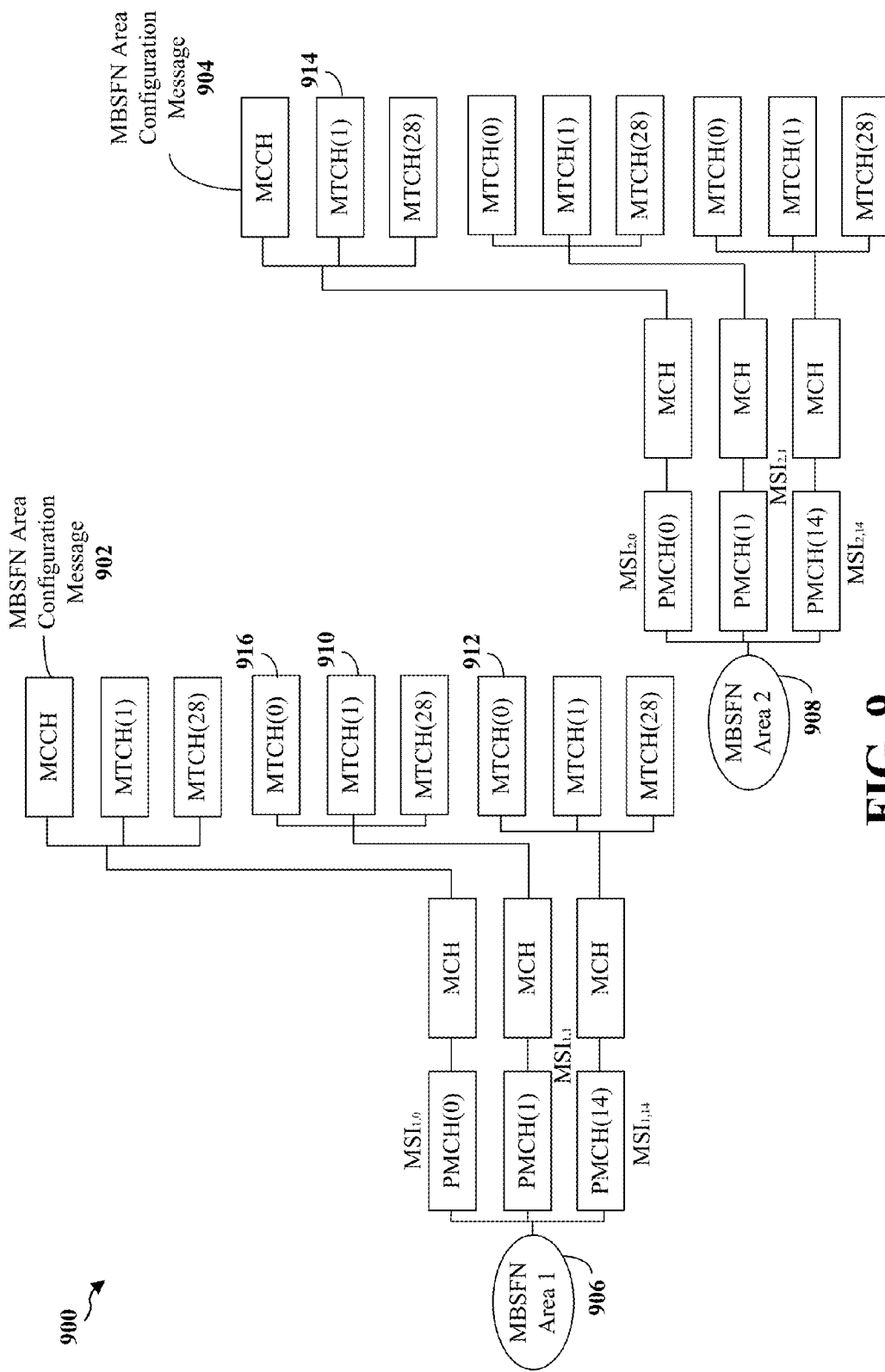
FIG. 9 is a second diagram for illustrating an exemplary method.

FIG. 9 is a diagram 900 for illustrating an exemplary method. As discussed supra, a UE stores configuration information from MBSFN area configuration messages for a plurality of MBSFN areas and/or MSI for one or more PMCHs, and accesses the stored information in order to add or to switch to a new eMBMS channel quickly, without waiting to acquire the eMBMS control information for that eMBMS channel. For example, assume a UE is receiving MTCH(1) 910 associated with PMCH(1) of a first MBSN area 906. While receiving the MTCH(1) 910, the UE may acquire the MBSFN area configuration messages 902, 904, and store the configuration information in the MBSFN area configuration messages 902, 904. When the UE determines to receive the MTCH(0) 912 associated with PMCH(14) of the first MBSFN area 906, the UE accesses the stored configuration information to obtain the TMGIs and optional session identifiers, allocated resources for transmitting each PMCH of the first MBSFN area 906 and the allocation period of the allocated resources for all the PMCHs in the first MBSFN area 906, and an MSP over which the MSI MAC control element is transmitted. Based on the obtained configuration information, the UE obtains the MSI for the PMCH(14) of the first MBSFN area 906. Based on the obtained MSI, the UE is able to receive the MTCH(0) 912. The UE may receive the MTCH(0) 912 faster/earlier than the UE would have received the MTCH otherwise had the UE obtained the configuration information in the MBSFN area configuration message 902 through monitoring the MCCH.

Likewise, when the UE determines to receive the MTCH (1) 914 associated with PMCH(0) of the second MBSFN area 908, the UE accesses the stored configuration information to obtain the TMGIs and optional session identifiers, allocated resources for transmitting each PMCH of the second MBSFN area 908 and the allocation period of the allocated resources for all the PMCHs in the second MBSFN area 908, and an MSP over which the MSI MAC control element is transmitted. Based on the obtained configuration information, the UE obtains the MSI for the PMCH(0) of the second MBSFN area 908. Based on the obtained MSI, the UE is able to receive the MTCH(1) 914. The UE may receive the MTCH(1) 914 faster/earlier than the UE would have received the MTCH otherwise had the UE obtained the configuration information in the MBSFN area configuration message 904 through monitoring the MCCH.

The UE may alternatively or additionally store MSI associated with one or more PMCHs. For example, assume a UE is receiving MTCH(1) 910 associated with PMCH(1) of a first MBSFN area 906. In a first embodiment, the UE may store $MSI_{1,1}$ associated with the PMCH(1) of the first MBSFN area 906. In a second embodiment, the UE may store $MSI_{1,0}$, $MSI_{1,1}$, . . . , $MSI_{1,14}$ associated with all the PMCHs of the first MBSFN area 906. In a third embodiment, the UE may store $MSI_{1,0}$, $MSI_{1,1}$, . . . , $MSI_{1,14}$ associated with all the PMCHs of the first MBSFN area 906 and $MSI_{2,0}$, $MSI_{2,1}$, . . . , $MSI_{2,14}$ associated with all the PMCHs of the second MBSFN area 908. In a fourth embodiment, the UE may store any subsets of MSI associated with one or more of the available MBSFN areas. If the first, second, or third embodiments are implemented, when the UE determines to receive the MTCH(0) 916 associated with PMCH(1) of the first MBSFN area 906, the UE accesses the stored MSI to obtain the stop frame and subframe of each MTCH within the PMCH(1) of the first MBSFN area 906. Based on the MSI, the UE is able to receive the MTCH(0) 916. The UE may receive the MTCH(0) 916 faster/earlier than the UE would have received the MTCH otherwise had the UE obtained the MSI through monitoring for the MSI MAC control element. If the second or third embodiments are implemented, when the UE determines to receive the MTCH(0) 912 associated with PMCH(14) of the first MBSFN area 906, the UE accesses the stored MSI to obtain the stop frame and subframe of each MTCH within the PMCH(14) of the first MBSFN area 906. Based on the MSI, the UE is able to receive the MTCH(0) 912. The UE may receive the MTCH(0) 912 faster/earlier than the UE would have received the MTCH otherwise had the UE obtained the MSI through monitoring for the MSI MAC control element. If the third embodiment is implemented, when the UE determines to receive the MTCH(1) 914 associated with PMCH(0) of the second MBSFN area 908, the UE accesses the stored MSI to obtain the stop frame and subframe of each MTCH within the PMCH(0) of the second MBSFN area 908. Based on the MSI, the UE is able to receive the MTCH(1) 914. The UE may receive the MTCH(1) 914 faster/earlier than the UE would have received the MTCH otherwise had the UE obtained the MSI through monitoring for the MSI MAC control element. By storing MSI for each of one or more PMCHs associated with one or more MBSFN areas, the UE may save time by avoiding acquiring MSI for an MTCH when switching to or adding the MTCH.

Figure 10:
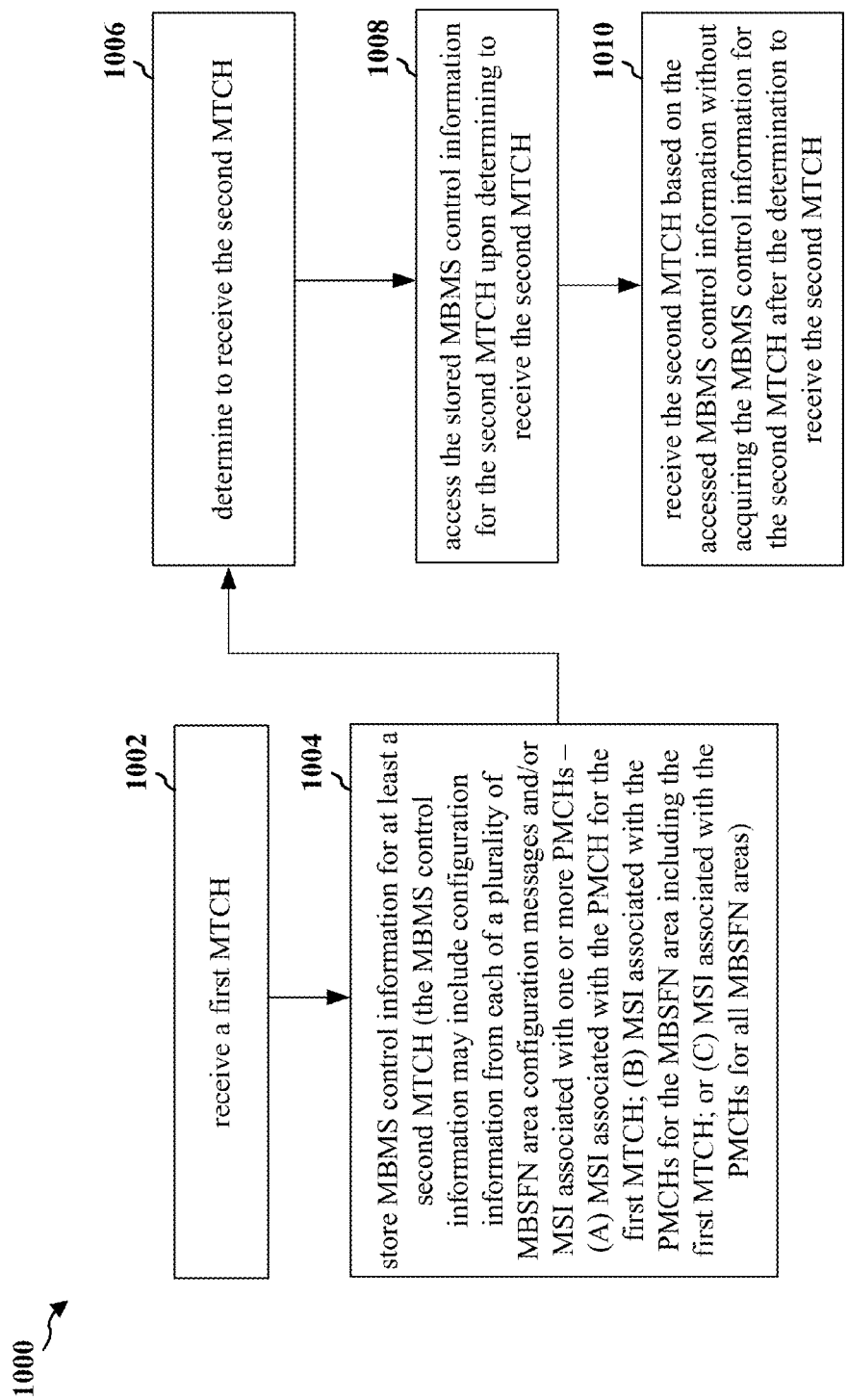
FIG. 10 is a flow chart of a first method of wireless communication.

FIG. 10 is a flow chart 1000 of a method of wireless communication. The method may be performed by a UE. As shown in FIG. 10, in step 1002, a UE receives a first MTCH. In step 1004, the UE stores MBMS control information for at least a second MTCH. The MBMS control information may include configuration information received on at least one MCCH and/or MSI. Each of the at least one MCCH may be associated with a different MBSFN area. The configuration information may be carried in an MBSFN area configuration message. The MSI may be associated with one or more PMCHs. For example, the MSI may be associated with the PMCH for the first MTCH, associated with the PMCHs for the MBSFN area for the first MTCH, or associated with all PMCHs for all MBSFN areas. In step 1006, the UE determines to receive the second MTCH. In step 1008, the UE accesses the stored MBMS control information for the second MTCH upon determining to receive the second MTCH. In step 1010, the UE receives the second MTCH based on the accessed MBMS control information without acquiring the MBMS control information (through monitoring for the corresponding MBSFN area configuration messages and the MSI MAC control element) for the second MTCH after the determination to receive the second MTCH.

For example, referring to FIG. 9, a UE may receive the MTCH(1) 910. The UE may store MBMS control information for at least a second MTCH, such as any one of the MTCHs associated with the first MBSFN area 906 or the second MBSFN area 908. Assume the UE determines to receive the MTCH(0) 916. If the UE has stored the MBSFN area configuration message 902 or the relevant information in the MBSFN area configuration message 902, the UE accesses the stored MBSFN area configuration message 902. If the UE has stored the $MSI_{1,1}$, the UE accesses the stored MSI. The UE then receives the MTCH(0) 916 based on the accessed MBSFN area configuration message 902 and the $MSI_{1,1}$. Assume the UE determines to receive the MTCH(0) 912. If the UE has stored the MBSFN area configuration message 902 or the relevant information in the MBSFN area configuration message 902, the UE accesses the stored MBSFN area configuration message 902. If the UE has stored the $MSI_{1,14}$ (e.g., through the process of storing $MSI_{1,0}$, $MSI_{1,1}$, ..., $MSI_{1,14}$ or a set of MSI that includes $MSI_{1,14}$) the UE accesses the stored MSI. The UE then receives the MTCH(0) 912 based on the accessed MBSFN area configuration message 902 and the $MSI_{1,14}$. Assume the UE determines to receive the MTCH(1) 914. If the UE has stored the MBSFN area configuration message 904 or the relevant information in the MBSFN area configuration message 904, the UE accesses the stored MBSFN area configuration message 904. If the UE has stored the $MSI_{2,0}$ (e.g., through the process of storing $MSI_{1,0}$, $MSI_{1,1}$, ..., $MSI_{1,14}$ and $MSI_{2,0}$, $MSI_{2,1}$, ..., $MSI_{2,14}$ or a set of MSI that includes $MSI_{2,0}$) the UE accesses the stored MSI. The UE then receives the MTCH(1) 914 based on the accessed MBSFN area configuration message 904 and the $MSI_{2,0}$.

Figure 11:
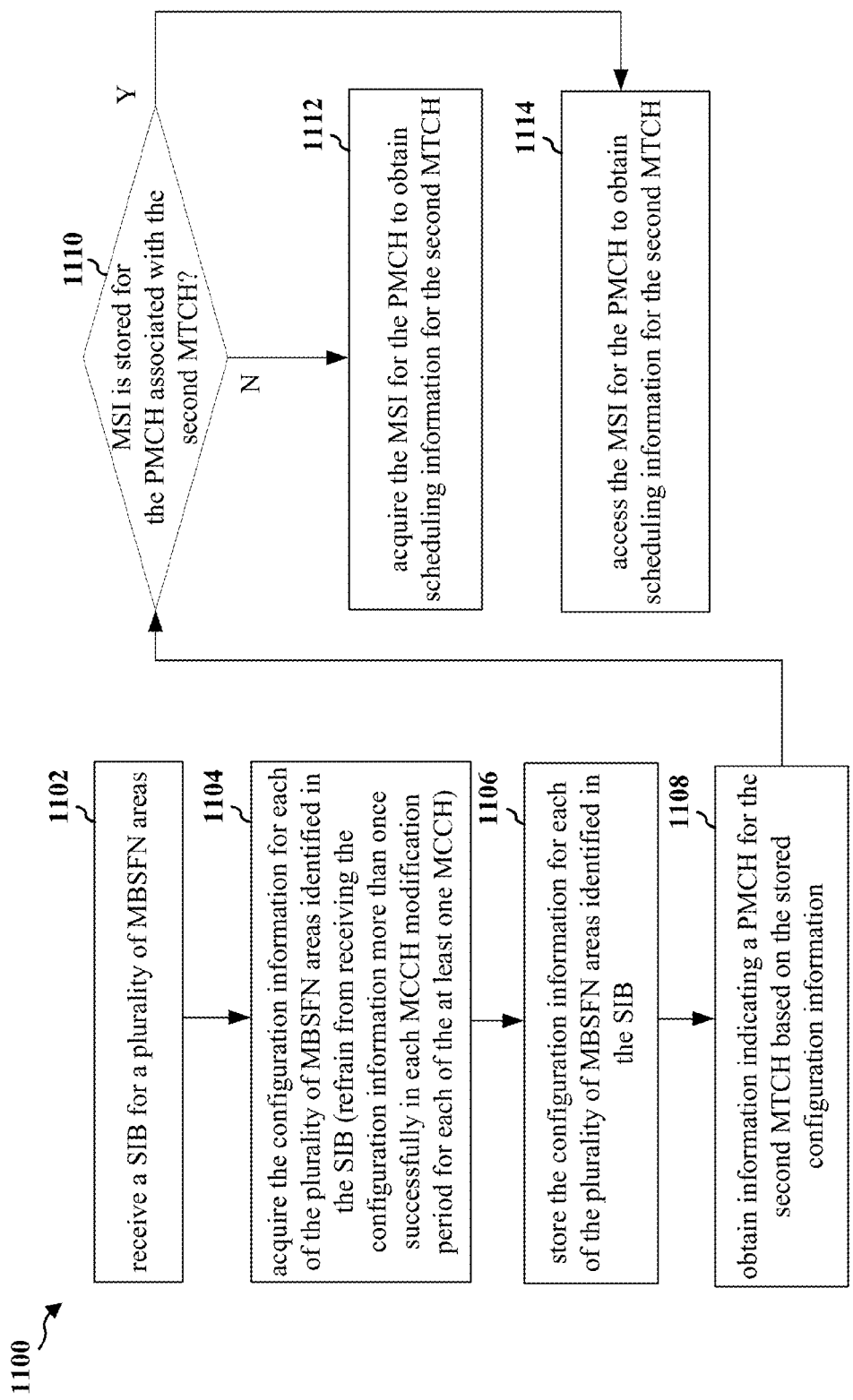
FIG. 11 is a flow chart of a second method of wireless communication.

FIG. 11 is a flow chart 1100 of a second method of wireless communication. The method may be performed by a UE. In step 1102, a UE receives a SIB for a plurality of MBSFN areas. In step 1104, the UE acquires the configuration information for each of the plurality of MBSFN areas identified in the SIB. In step 1104, the UE may refrain from receiving the configuration information more than once successfully in each MCCH modification period for each of the at least one MCCH. In step 1106, the UE stores the configuration information for each of the plurality of MBSFN areas identified in the SIB. For example, referring to FIG. 9, the UE may store the MBSFN area configuration messages 902, 904 and MSI associated with one or more of the PMCHs for the MBSFN areas 906, 908. Upon determining to receive a second MTCH, in step 1108, the UE obtains information indicating a PMCH for the second MTCH based on the stored configuration information. For example, referring to FIG. 9, upon determining to receive the MTCH(1) 914, the UE may obtain information based on the stored configuration information indicating that the MTCH(1) 914 is provided through PMCH(0) of the second MBSFN area 908. In step 1110, the UE determines whether MSI is stored for the PMCH. For example, referring to FIG. 9, the UE may determine whether $MSI_{2,0}$ is stored for the PMCH(0) of the second MBSFN area 908. When the MSI is not stored for the PMCH, in step 1112, the UE acquires the MSI for the PMCH to obtain scheduling information for the second MTCH. When the MSI is stored for the PMCH, in step 1114, the UE accesses the stored MSI for the PMCH to obtain scheduling information for the second MTCH.

Figure 12:
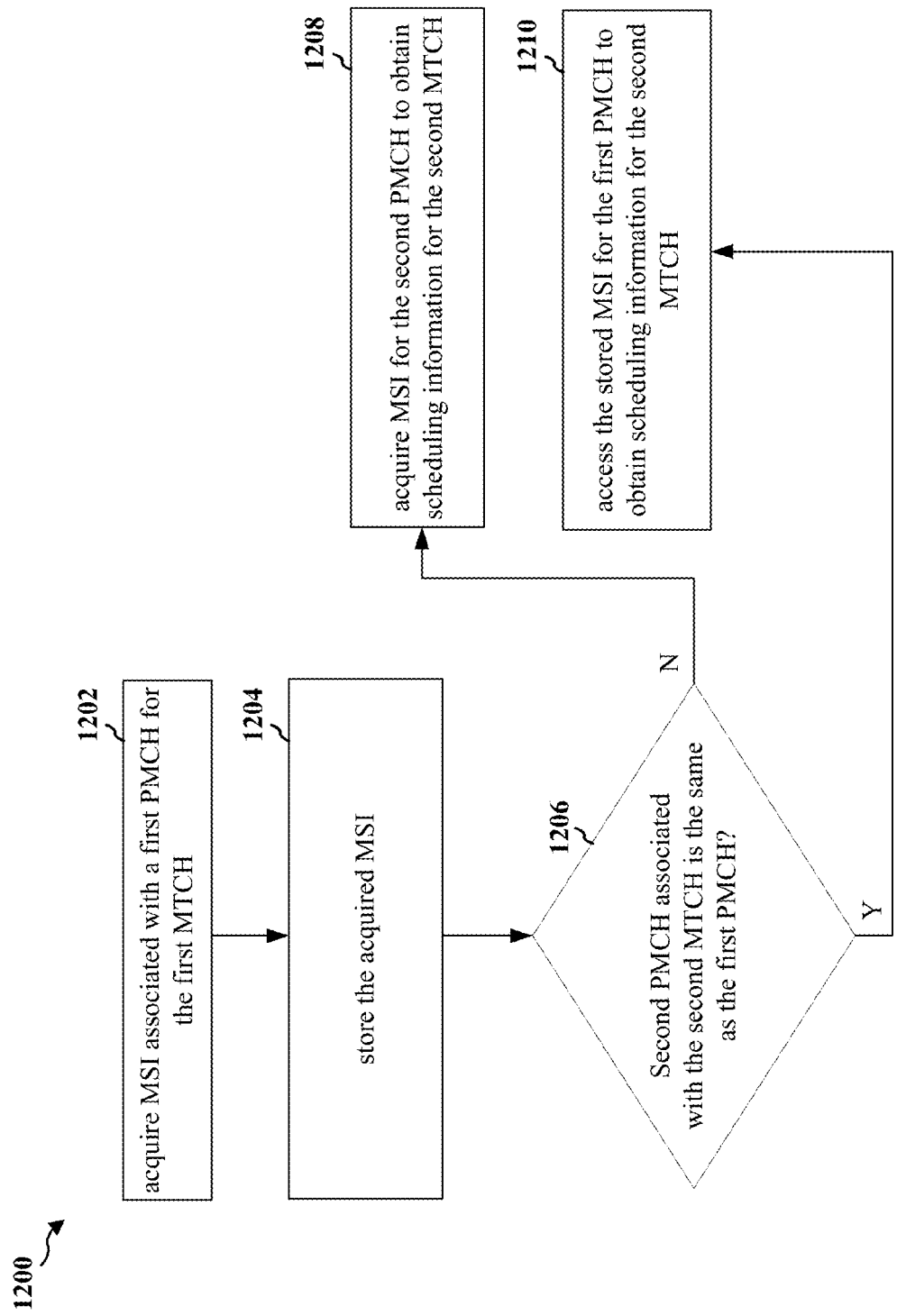
FIG. 12 is a flow chart of a third method of wireless communication.

FIG. 12 is a flow chart 1200 of a third method of wireless communication. The method may be performed by a UE. In step 1202, a UE acquires MSI associated with a first PMCH for the first MTCH. In step 1204, the UE stores the acquired MSI. In step 1206, the UE determines whether a second PMCH associated with the second MTCH is the same as the first PMCH. For example, the UE may determine whether the second PMCH is the same as the first PMCH by comparing identities of the first and second PMCHs. When the identities are the same, the UE determines that the first PMCH and the second PMCH are the same. When the second PMCH and the first PMCH are not the same, in step 1208, the UE acquires MSI for the second PMCH to obtain scheduling information for the second MTCH. When the second PMCH and the first PMCH are the same, in step 1210, the UE accesses the stored MSI for the first PMCH to obtain scheduling information for the second MTCH. For example, referring to FIG. 9, a UE may acquire $MSI_{1,1}$ associated with PMCH(1) for the MTCH(1) 910 of the first MBSFN area 906. The UE may store the $MSI_{1,1}$ or the information in the $MSI_{1,1}$. Subsequently, the UE may determine to receive MTCH(0) 916. The UE may then determine whether PMCH(1) of the first MBSFN area 906 associated with the MTCH(0) 916 is the same as the PMCH(1) of the first MBSFN area 906 associated with the MTCH(1) 910. Because the PMCHs are the same, the UE then accesses the stored $MSI_{1,1}$ or the stored information of the $MSI_{1,1}$, obtains scheduling information for the MTCH(0) 916 based on the accessed information, and utilizes the obtained scheduling information to receive the MTCH(0) 916. For another example, referring to FIG. 9, a UE may acquire $MSI_{1,1}$ associated with PMCH(1) for the MTCH(1) 910 of the first MBSFN area 906. The UE may store the $MSI_{1,1}$ or the information in the $MSI_{1,1}$. Subsequently, the UE may determine to receive MTCH(0) 912. The UE may then determine whether PMCH(14) of the first MBSFN area 906 associated with the MTCH(0) 912 is the same as the PMCH(1) of the first MBSFN area 906 associated with the MTCH(1) 910. Because the PMCHs are not the same, the UE then acquires the $MSI_{1,14}$ and utilizes the scheduling information obtained in the acquired $MSI_{1,14}$ to receive the MTCH(0) 912.

Figure 13:
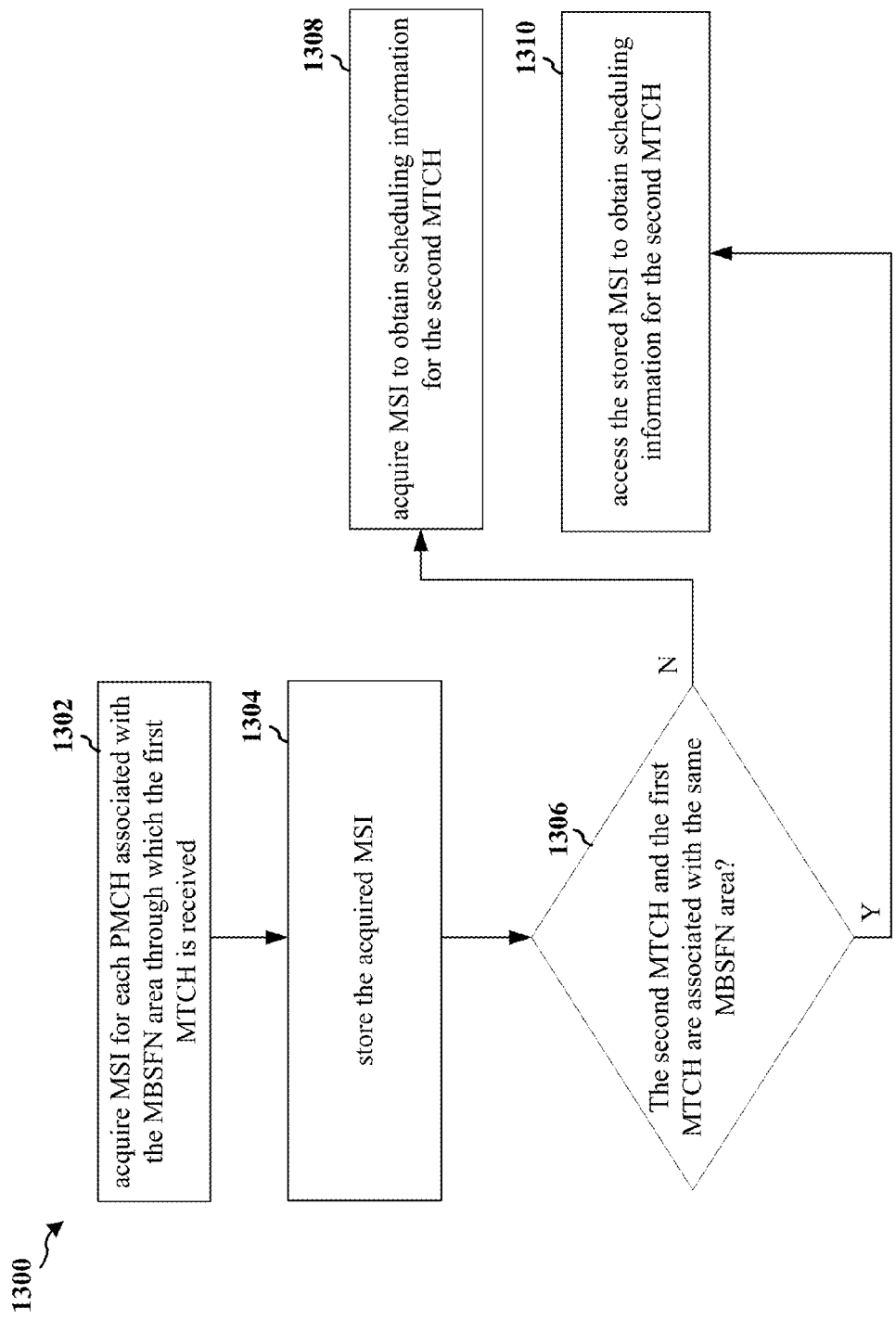
FIG. 13 is a flow chart of a fourth method of wireless communication.

FIG. 13 is a flow chart 1300 of a fourth method of wireless communication. The method may be performed by a UE. In step 1302, a UE acquires MSI for each PMCH associated with an MBSFN area of an MTCH that the UE is currently receiving. For example, referring to FIG. 9, a UE receiving the MTCH(1) 910 may acquire the $MSI_{1,0}$, $MSI_{1,1}$, ..., $MSI_{1,14}$ associated with the first MBSFN area 906. In step 1304, the UE stores the acquired MSI. Upon determining to receive a second MTCH, in step 1306, the UE determines whether the second MTCH is associated with the same MBSFN area. For example, referring to FIG. 9, upon determining to receive the MTCH(0) 916, a UE may determine whether the MTCH(0) 916 is associated with the first MBSFN area 906. When the second MTCH is unassociated with the MBSFN area, in step 1308, the UE acquires MSI to obtain scheduling information for the second MTCH. For example, referring to FIG. 9, if the UE determines to receive MTCH(1) 914, the UE will need to acquire the $MSI_{2,0}$ to obtain scheduling information for the MTCH(1) 914, as the UE has not previously stored the $MSI_{2,0}$. When the second MTCH is associated with and is received through the MBSFN area, in step 1310, the UE accesses the stored MSI to obtain scheduling information for the second MTCH. For example, referring to FIG. 9, if the UE determines to receive MTCH(0) 912, the UE can access stored MSI information of the $MSI_{1,14}$ to obtain scheduling information for the MTCH (0) 912, as the UE previously stored the $MSI_{1,14}$.

Figure 14:
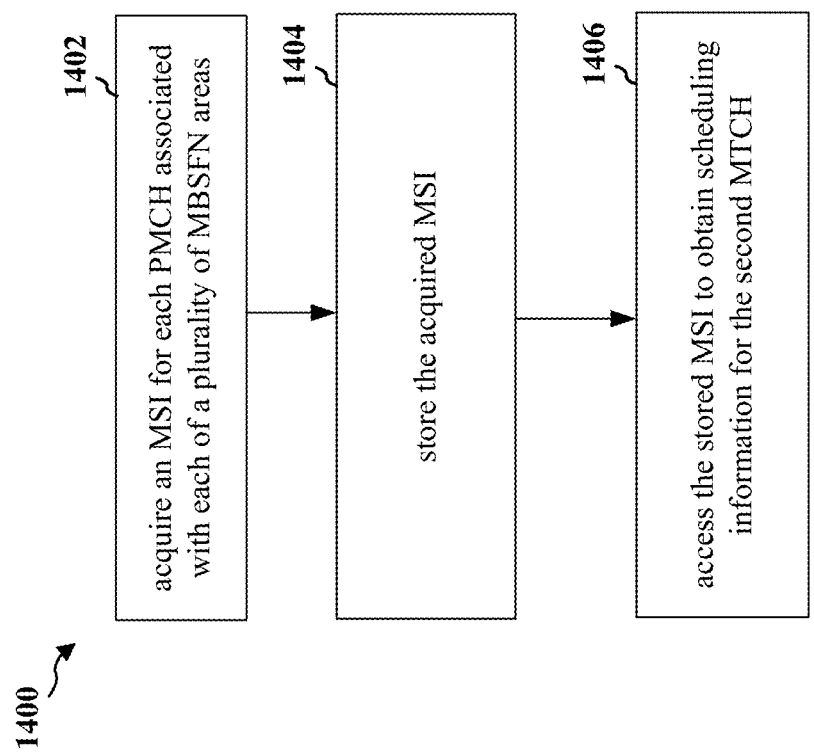
FIG. 14 is a flow chart of a fifth method of wireless communication.

FIG. 14 is a flow chart 1400 of a fifth method of wireless communication. The method may be performed by a UE. In step 1402, a UE acquires MSI for each PMCH associated with each of a plurality of MBSFN areas. In step 1404, the UE stores the acquired MSI. When the UE desires to receive a second MTCH, in step 1406, the UE accesses the stored MSI to obtain scheduling information for the second MTCH. The UE receives the second MTCH based on the obtained scheduling information. For example, referring to FIG. 9, a UE acquires the $MSI_{1,0}$, $MSI_{1,1}$, $MSI_{1,14}$ for the first MBSFN area 906 and the $MSI_{2,0}$, $MSI_{2,1}$, $MSI_{2,14}$ for the second MBSFN area 908. The UE stores the acquired MSI. When the UE desires to receive a different MTCH, the UE accesses the stored MSI to obtain scheduling information for that MTCH.

By storing MBMS control information such as the information included in MBSFN area configuration messages and MSI associated with MTCHs that the UE is not currently receiving, the UE is able to access the stored MBMS control information immediately when switching to or adding a different MTCH rather than wait to acquire the MBMS control information from the MCCH and the MSI MAC control element. As such, the provided methods may reduce the time for acquiring MBMS control information and therefore reduce channel switching/adding delay.

Figure 15:
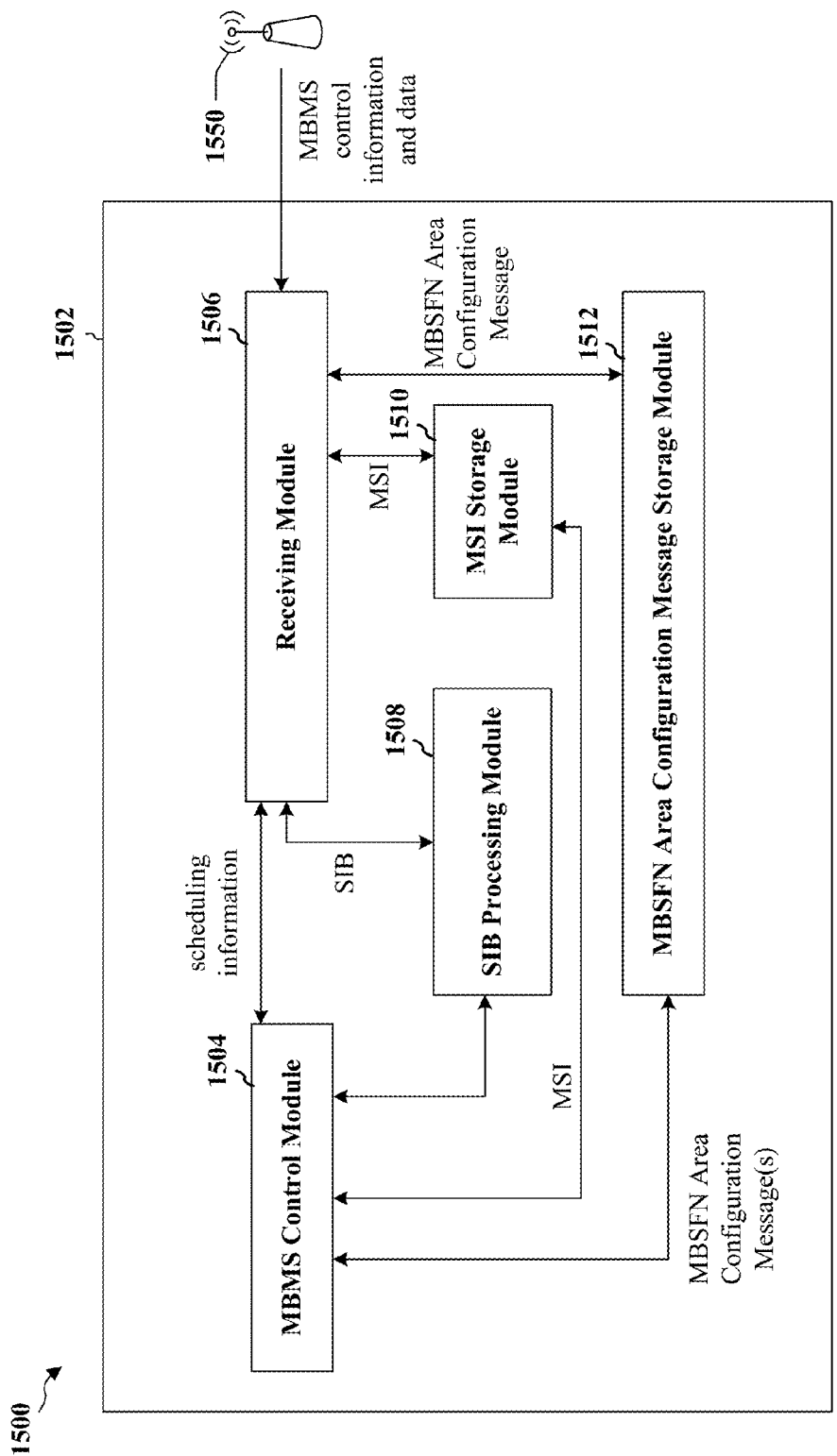
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE. The apparatus includes a receiving module 1506 that is configured to receive a first MTCH from the eNB 1550. The apparatus further includes an MSI storage module 1510 and/or an MBSFN area configuration message storage module 1512 that are configured to store MBMS control information for at least a second MTCH. The MBMS control information is received from the eNB 1550. The apparatus further includes an MBMS control module 1504 that is configured to determine to receive the second MTCH from the eNB 1550. The MBMS control module 1504 is configured to access the stored MBMS control information for the second MTCH upon determining to receive the second MTCH. The receiving module 1506 is configured to receive the second MTCH based on the accessed MBMS control information without acquiring the MBMS control information for the second MTCH after the determination to receive the second MTCH.

The MBMS control information may include at least one of configuration information on at least one MCCH or MSI. Each of the at least one MCCH may be associated with a different MBSFN area. The configuration information may be carried in an MBSFN area configuration message. The MBMS control information may include the configuration information on the at least one MCCH. The receiving module 1506 may be further configured to receive a SIB for a plurality of MBSFN areas. The MBMS control module 1504 may be further configured to communicate with the receiving module 1506 to request the receiving module 1506 to acquire the configuration information for each of the plurality of MBSFN areas identified in the SIB. The at least one MCCH may include an MCCH for each of the plurality of MBSFN areas identified in the SIB, and the configuration information for each of the plurality of MBSFN areas identified in the SIB may be stored. The MBMS control module 1504 may be configured to obtain information indicating a PMCH for the second MTCH based on the accessed configuration information. The MBMS control module 1504 may be configured to determine whether MSI is stored for the PMCH. The MBMS control module 1504 may be further configured to communicate with the receiving module 1506 to request the receiving module 1506 to acquire the MSI for the PMCH to obtain scheduling information for the second MTCH when the MSI is not stored for the PMCH. The MBMS control module 1504 may be further configured to communicate with the MBSFN area configuration message storage module 1512 and/or the MSI storage module 1510 to access the MSI for the PMCH to obtain scheduling information for the second MTCH when the MSI is stored for the PMCH. The second MTCH may be received based on the obtained scheduling information. The receiving module 1506 may be configured to refrain from receiving the configuration information more than once successfully in each MCCH modification period for each of the at least one MCCH.

The MBMS control information may include the MSI carried in an MSI MAC control element. The MBMS control module 1504 may be configured to communicate with the receiving module 1506 to request the receiving module 1506 to acquire MSI associated with a first PMCH for the first MTCH. The MSI storage module 1510 may be configured to store the acquired MSI. The MBMS control module 1504 may be configured to determine whether a second PMCH associated with the second MTCH is the same as the first PMCH. The MBMS control module 1504 may be configured to communicate with the receiving module 1506 to request the receiving module 1506 to acquire MSI for the second PMCH to obtain scheduling information for the second MTCH when the second PMCH and the first PMCH are not the same. The stored MSI for the first PMCH may be accessed to obtain scheduling information for the second MTCH when the second PMCH and the first PMCH are the same, and the second MTCH may be received based on the obtained scheduling information.

The first MTCH may be received through an MBSFN area. The MBMS control module 1504 may be configured to communicate with the receiving module 1506 to request the receiving module 1506 to acquire MSI for each PMCH associated with the MBSFN area. The MSI storage module may be configured to store the acquired MSI. The MBMS control module 1504 may be configured to determine whether the second MTCH is associated with the MBSFN area. The MBMS control module 1504 may be configured to communicate with the receiving module 1506 to request the receiving module 1506 to acquire MSI to obtain scheduling information for the second MTCH when the second MTCH is unassociated with the MBSFN area. The stored MSI may be accessed to obtain scheduling information for the second MTCH when the second MTCH is associated with and is received through the MBSFN area, and the second MTCH may be received based on the obtained scheduling information. The MBMS control module 1504 may be further configured to communicate with the receiving module 1506 to request the receiving module 1506 to acquire MSI for each PMCH associated with each of a plurality of MBSFN areas. The acquired MSI may be stored, the stored MSI may be accessed to obtain scheduling information for the second MTCH, and the second MTCH may be received based on the obtained scheduling information.

The apparatus may include additional modules that perform each of the steps of the algorithm in the aforementioned flow charts of FIGS. 10-14. As such, each step in the aforementioned flow charts of FIGS. 10-14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
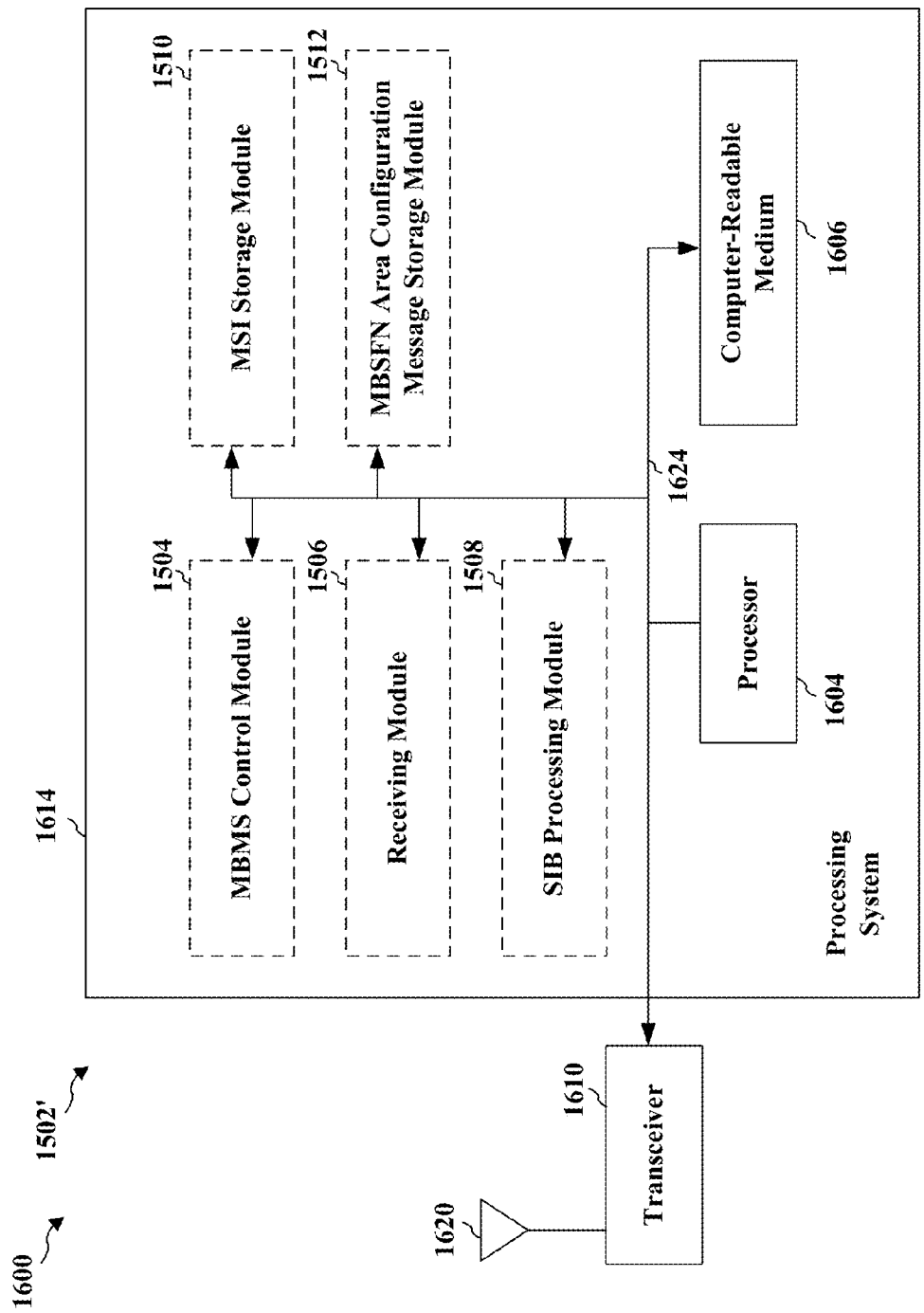
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1506. In addition, the transceiver 1610 receives information from the processing system 1614, and based on the received information, generates a signal to be applied to the one or more antennas 1620. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, 1510, and 1512. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for receiving a first MTCH, means for storing MBMS control information for at least a second MTCH, means for determining to receive the second MTCH, means for accessing the stored MBMS control information for the second MTCH upon determining to receive the second MTCH, and means for receiving the second MTCH based on the accessed MBMS control information without acquiring the MBMS control information for the second MTCH after the determination to receive the second MTCH. The MBMS control information may include at least one of configuration information on at least one MCCH or MSI. Each of the at least one MCCH may be associated with a different MBSFN area. The configuration information may be carried in an MBSFN area configuration message. The MBMS control information may include the configuration information on the at least one MCCH. The apparatus may further include means for receiving a SIB for a plurality of MBSFN areas, and means for acquiring the configuration information for each of the plurality of MBSFN areas identified in the SIB. The at least one MCCH may include an MCCH for each of the plurality of MBSFN areas identified in the SIB, and the configuration information for each of the plurality of MBSFN areas identified in the SIB may be stored. The apparatus may further include means for obtaining information indicating a PMCH for the second MTCH based on the accessed configuration information, means for determining whether MSI is stored for the PMCH, means for acquiring the MSI for the PMCH to obtain scheduling information for the second MTCH when the MSI is not stored for the PMCH, and means for accessing the MSI for the PMCH to obtain scheduling information for the second MTCH when the MSI is stored for the PMCH. The second MTCH may be received based on the obtained scheduling information. The apparatus may further include means for refraining from receiving the configuration information more than once successfully in each MCCH modification period for each of the at least one MCCH. The MBMS control information may include the MSI carried in an MSI MAC control element. The apparatus may further include means for acquiring MSI associated with a first PMCH for the first MTCH, means for storing the acquired MSI, means for determining whether a second PMCH associated with the second MTCH is the same as the first PMCH, and means for acquiring MSI for the second PMCH to obtain scheduling information for the second MTCH when the second PMCH and the first PMCH are not the same. The stored MSI for the first PMCH may be accessed to obtain scheduling information for the second MTCH when the second PMCH and the first PMCH are the same, and the second MTCH may be received based on the obtained scheduling information. The first MTCH may be received through an MBSFN area, and the apparatus may further include means for acquiring MSI for each PMCH associated with the MBSFN area, means for storing the acquired MSI, means for determining whether the second MTCH is associated with the MBSFN area, and means for acquiring MSI to obtain scheduling information for the second MTCH when the second MTCH is unassociated with the MBSFN area. The stored MSI may be accessed to obtain scheduling information for the second MTCH when the second MTCH is associated with and is received through the MBSFN area, and the second MTCH is received based on the obtained scheduling information. The apparatus may further include means for acquiring MSI for each PMCH associated with each of a plurality of MBSFN areas. The acquired MSI may be stored, the stored MSI may be accessed to obtain scheduling information for the second MTCH, and the second MTCH may be received based on the obtained scheduling information.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving a first multicast traffic channel (MTCH) that corresponds to a service of interest;
storing multimedia broadcast multicast service (MBMS) control information for a second MTCH that does not correspond to the service of interest, the MBMS control information for the second MTCH including configuration information on at least one multicast channel (MCH) scheduling information (MSI) associated with one or more physical multicast channels (PMCHs);
determining to receive the second MTCH;
accessing the stored MBMS control information for the second MTCH upon the determination to receive the second MTCH;
receiving the second MTCH based on the accessed MBMS control information without acquiring the MBMS control information for the second MTCH after the determination to receive the second MTCH; and
acquiring MSI for a second PMCH to obtain scheduling information for the second MTCH,
wherein the stored MSI is accessed to obtain scheduling information for the second MTCH when the second PMCH and the first PMCH are the same or when the second MTCH is associated with and is received through an MBSFN area, and the second MTCH is received based on the obtained scheduling information.

2. The method of claim 1, wherein the MBMS control information further includes configuration information on at least one multicast control channel (MCCH), each of the at least one MCCH being associated with a different Multicast Broadcast Single Frequency Network (MBSFN) area.

3. The method of claim 2, wherein the configuration information is carried in a Multicast Broadcast Single Frequency Network (MBSFN) area configuration message.

4. The method of claim 2, wherein the MBMS control information comprises the configuration information on the at least one MCCH.

5. The method of claim 4, further comprising:
receiving a system information block (SIB) for a plurality of MBSFN areas; and
acquiring the configuration information for each of the plurality of MBSFN areas identified in the SIB,
wherein the at least one MCCH comprises an MCCH for each of the plurality of MBSFN areas identified in the SIB, and the configuration information for each of the plurality of MBSFN areas identified in the SIB is stored.

6. The method of claim 4, further comprising:
obtaining information indicating a PMCH for the second MTCH based on the accessed configuration information;
determining whether the MSI is stored for the PMCH;
acquiring the MSI for the PMCH to obtain scheduling information for the second MTCH when the MSI is not stored for the PMCH; and
accessing the MSI for the PMCH to obtain scheduling information for the second MTCH when the MSI is stored for the PMCH,
wherein the second MTCH is received based on the obtained scheduling information.

7. The method of claim 4, further comprising refraining from receiving the configuration information more than once successfully in each MCCH modification period for each of the at least one MCCH.

8. The method of claim 2, wherein the MBMS control information comprises the MSI carried in an MSI media access control (MAC) control element.

9. The method of claim 8, further comprising:
acquiring the MSI associated with a first PMCH for the first MTCH;
storing the acquired MSI; and
determining whether the second PMCH associated with the second MTCH is the same as the first PMCH,
wherein the MSI for the second PMCH is acquired when the second PMCH and the first PMCH are not the same.

10. The method of claim 8, wherein the first MTCH is received through the MBSFN area, and the method further comprises:
acquiring the MSI for each PMCH associated with the MBSFN area;
storing the acquired MSI; and
determining whether the second MTCH is associated with the MBSFN area,
wherein the MSI is acquired when the second MTCH is unassociated with the MBSFN area.

11. The method of claim 8, further comprising acquiring the MSI for each PMCH associated with each of a plurality of MBSFN areas, wherein the acquired MSI is stored, the stored MSI is accessed to obtain scheduling information for the second MTCH, and the second MTCH is received based on the obtained scheduling information.

12. An apparatus for wireless communication, comprising:
means for receiving a first multicast traffic channel (MTCH) that corresponds to a service of interest;
means for storing multimedia broadcast multicast service (MBMS) control information for a second MTCH that does not correspond to the service of interest, the MBMS control information for the second MTCH including configuration information on at least one multicast channel (MCH) scheduling information (MSI) associated with one or more physical multicast channels (PMCHs);
means for determining to receive the second MTCH;
means for accessing the stored MBMS control information for the second MTCH upon the determination to receive the second MTCH;
means for receiving the second MTCH based on the accessed MBMS control information without acquiring the MBMS control information for the second MTCH after the determination to receive the second MTCH; and
means for acquiring MSI for a second PMCH to obtain scheduling information for the second MTCH,
wherein a stored MSI is accessed to obtain scheduling information for the second MTCH when the second PMCH and the first PMCH are the same or when the second MTCH is associated with and is received through an MBSFN area, and the second MTCH is received based on the obtained scheduling information.

13. The apparatus of claim 12, wherein the MBMS control information further includes configuration information on at least one multicast control channel (MCCH), each of the at least one MCCH being associated with a different Multicast Broadcast Single Frequency Network (MBSFN) area.

14. The apparatus of claim 13, wherein the configuration information is carried in a Multicast Broadcast Single Frequency Network (MBSFN) area configuration message.

15. The apparatus of claim 13, wherein the MBMS control information comprises the configuration information on the at least one MCCH.

16. The apparatus of claim 15, further comprising:
means for receiving a system information block (SIB) for a plurality of MBSFN areas; and
means for acquiring the configuration information for each of the plurality of MBSFN areas identified in the SIB,
wherein the at least one MCCH comprises an MCCH for each of the plurality of MBSFN areas identified in the SIB, and the configuration information for each of the plurality of MBSFN areas identified in the SIB is stored.

17. The apparatus of claim 15, further comprising:
means for obtaining information indicating a PMCH for the second MTCH based on the accessed configuration information;
means for determining whether MSI is stored for the PMCH;
means for acquiring the MSI for the PMCH to obtain scheduling information for the second MTCH when the MSI is not stored for the PMCH; and
means for accessing the MSI for the PMCH to obtain scheduling information for the second MTCH when the MSI is stored for the PMCH,
wherein the second MTCH is received based on the obtained scheduling information.

18. The apparatus of claim 15, further comprising means for refraining from receiving the configuration information more than once successfully in each MCCH modification period for each of the at least one MCCH.

19. The apparatus of claim 13, wherein the MBMS control information comprises the MSI carried in an MSI media access control (MAC) control element.

20. The apparatus of claim 19, further comprising:
means for acquiring the MSI associated with a first PMCH for the first MTCH;
means for storing the acquired MSI; and
means for determining whether a second PMCH associated with the second MTCH is the same as the first PMCH,
wherein the MSI for the second PMCH is acquired when the second PMCH and the first PMCH are not the same.

21. The apparatus of claim 19, wherein the first MTCH is received through the MBSFN area, and the apparatus further comprises:
means for acquiring the MSI for each PMCH associated with the MBSFN area;
means for storing the acquired MSI; and
means for determining whether the second MTCH is associated with the MBSFN area,
wherein the MSI is acquired when the second MTCH is unassociated with the MBSFN area.

22. The apparatus of claim 19, further comprising means for acquiring the MSI for each PMCH associated with each of a plurality of MBSFN areas, wherein the acquired MSI is stored, the stored MSI is accessed to obtain scheduling information for the second MTCH, and the second MTCH is received based on the obtained scheduling information.

23. An apparatus of wireless communication, comprising:
a memory; and
at least one processor coupled to the memory and configured to:
receive a first multicast traffic channel (MTCH) that corresponds to a service of interest;
store multimedia broadcast multicast service (MBMS) control information for a second MTCH that does not correspond to the service of interest, the MBMS control information for the second MTCH including configuration information on at least one multicast channel (MCH) scheduling information (MSI) associated with one or more physical multicast channels (PMCHs);
determine to receive the second MTCH;
access the stored MBMS control information for the second MTCH upon the determination to receive the second MTCH;
receive the second MTCH based on the accessed MBMS control information without acquiring the MBMS control information for the second MTCH after the determination to receive the second MTCH; and
acquire MSI for a second PMCH to obtain scheduling information for the second MTCH,
wherein a stored MSI is accessed to obtain scheduling information for the second MTCH when the second PMCH and the first PMCH are the same or when the second MTCH is associated with and is received through an MBSFN area, and the second MTCH is received based on the obtained scheduling information.

24. The apparatus of claim 23, wherein the MBMS control information further includes configuration information on at least one multicast control channel (MCCH), each of the at least one MCCH being associated with a different Multicast Broadcast Single Frequency Network (MBSFN) area.

25. The apparatus of claim 24, wherein the configuration information is carried in a Multicast Broadcast Single Frequency Network (MBSFN) area configuration message.

26. The apparatus of claim 24, wherein the MBMS control information comprises the configuration information on the at least one MCCH.

27. The apparatus of claim 26, wherein the at least one processor is further configured to:
  receive a system information block (SIB) for a plurality of MBSFN areas; and
  acquire the configuration information for each of the plurality of MBSFN areas identified in the SIB,
  wherein the at least one MCCH comprises an MCCH for each of the plurality of MBSFN areas identified in the SIB, and the configuration information for each of the plurality of MBSFN areas identified in the SIB is stored.

28. The apparatus of claim 26, wherein the at least one processor is further configured to:
  obtain information indicating a PMCH for the second MTCH based on the accessed configuration information;
  determine whether the MSI is stored for the PMCH;
  acquire the MSI for the PMCH to obtain scheduling information for the second MTCH when the MSI is not stored for the PMCH; and
  access the MSI for the PMCH to obtain scheduling information for the second MTCH when the MSI is stored for the PMCH,
  wherein the second MTCH is received based on the obtained scheduling information.

29. The apparatus of claim 26, wherein the at least one processor is further configured to refrain from receiving the configuration information more than once successfully in each MCCH modification period for each of the at least one MCCH.

30. The apparatus of claim 24, wherein the MBMS control information comprises the MSI carried in an MSI media access control (MAC) control element.

31. The apparatus of claim 30, wherein the at least one processor is further configured to:
  acquire the MSI associated with a first PMCH for the first MTCH;
  store the acquired MSI; and
  determine whether the second PMCH associated with the second MTCH is the same as the first PMCH,
  wherein the MSI for the second PMCH is acquired when the second PMCH and the first PMCH are not the same.

32. The apparatus of claim 30, wherein the first MTCH is received through the MBSFN area, and the at least one processor is further configured to:
  acquire the MSI for each PMCH associated with the MBSFN area;
  store the acquired MSI; and
  determine whether the second MTCH is associated with the MBSFN area;
  wherein the MSI is acquired when the second MTCH is unassociated with the MBSFN area.

33. The apparatus of claim 30, wherein the at least one processor is further configured to acquire the MSI for each PMCH associated with each of a plurality of MBSFN areas, wherein the acquired MSI is stored, the stored MSI is accessed to obtain scheduling information for the second MTCH, and the second MTCH is received based on the obtained scheduling information.

34. A non-transitory computer-readable medium storing computer executable code for wireless communication, comprising code for:
  receiving a first multicast traffic channel (MTCH) that corresponds to a service of interest;
  storing multimedia broadcast multicast service (MBMS) control information for a second MTCH that does not correspond to the service of interest, the MBMS control information for the second MTCH including configuration information on at least one multicast channel (MCH) scheduling information (MSI) associated with one or more physical multicast channels (PMCHs);
  determining to receive the second MTCH;
  accessing the stored MBMS control information for the second MTCH upon the determination to receive the second MTCH;
  receiving the second MTCH based on the accessed MBMS control information without acquiring the MBMS control information for the second MTCH after the determination to receive the second MTCH; and
  acquiring MSI for a second PMCH to obtain scheduling information for the second MTCH,
  wherein a stored MSI is accessed to obtain scheduling information for the second MTCH when the second PMCH and the first PMCH are the same or when the second MTCH is associated with and is received through an MBSFN area, and the second MTCH is received based on the obtained scheduling information.

* * * * *